United States Patent [19]
Stewart

[11] 4,208,235
[45] Jun. 17, 1980

[54] PAPER PROCESSING MACHINE
[75] Inventor: Gary E. Stewart, Phoenix, Ariz.
[73] Assignee: Trade Printers, Inc., Phoenix, Ariz.
[21] Appl. No.: 26,170
[22] Filed: Apr. 2, 1979
[51] Int. Cl.² .......................... B26D 5/00; B32D 31/00
[52] U.S. Cl. .................................... 156/353; 156/519; 156/522
[58] Field of Search ............... 156/522, 516, 250, 353, 156/361, 519

[56] References Cited
U.S. PATENT DOCUMENTS

| | | | |
|---|---|---|---|
| 2,289,336 | 7/1942 | Bamford | 156/519 |
| 2,990,081 | 6/1961 | DeNeui | 156/519 |
| 3,540,969 | 11/1970 | Jorgensen | 156/519 |
| 3,892,618 | 7/1975 | Griebat | 156/353 |
| 3,981,763 | 9/1976 | Brocklehurst | 156/519 |

*Primary Examiner*—Douglas J. Drummond
*Attorney, Agent, or Firm*—Tod R. Nissle; William H. Drummond; Gregory J. Nelson

[57] ABSTRACT

A machine for repetitively performing processing steps at spaced points on a moving strip of paper includes apparatus for timing the repetition of the processing steps. The timing apparatus consists of two generally circular cam plates, adjustably mounted co-axially on an end of a processing roller. The cam plates are adjustably rotatable with respect to each other around the axis of rotation of the processing drum to adjustably vary the angular displacement of the cam lobe surfaces of each plate to the other. Cam follower means are provided which are responsive to the combined effective length of the superimposed cam lobe surfaces. The cam follower means actuates the processing apparatus which performs the repetitive steps on the paper passing onto and partially around the processing drum.

1 Claim, 7 Drawing Figures

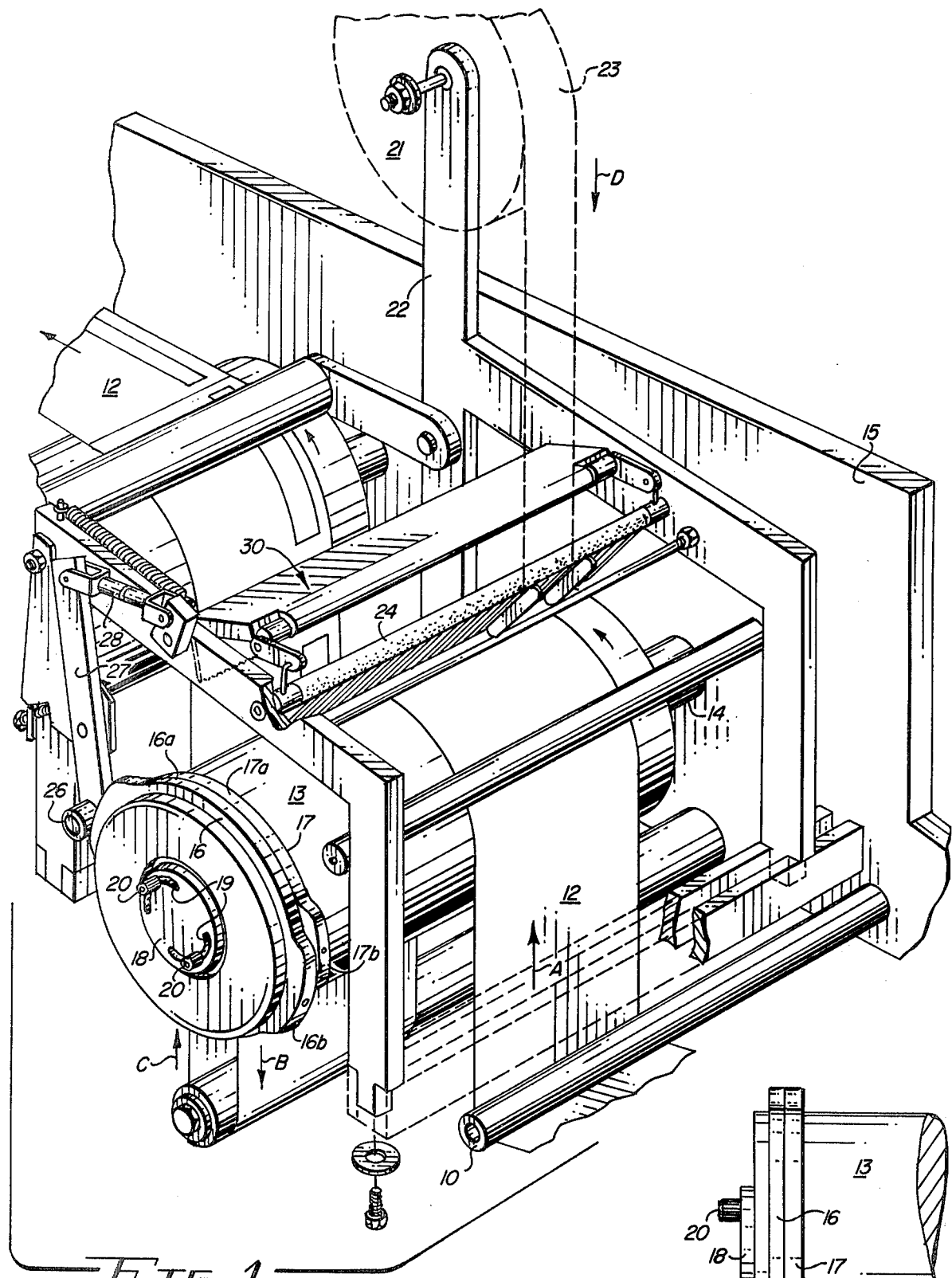
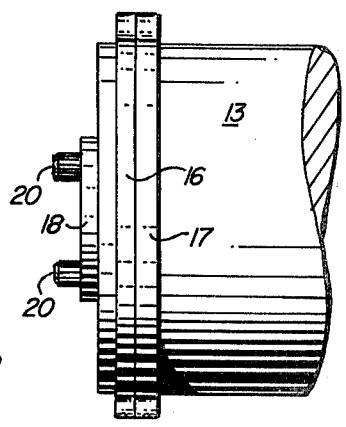
FIG.1
FIG.2

PAPER PROCESSING MACHINE

This invention relates to a machine for processing a continuous sheet of paper from a supply roll thereof.

More particularly, the invention pertains to a machine for carrying out a processing operation on a continuous strip of paper in which the processings step is repeatedly carried out at spaced points along the length of the continuous paper strip.

In a further and more particular aspect, the invention concerns a machine for applying spaced strips of transfer tape longitudinally along a continuous paper strip substrate.

In many paper manufacturing operations, such as printing and assembly of business forms and the like, it is common practice to carry out the operation in a series of repetitive steps at spaced points along a continously moving strip of paper and then cut the continuous strip into the size required to form the pages of the business form, booklet, etc. For example, it is common practice to print and collate multi-part business forms in such fashion and then cut the collated strips of paper into the proper size after assembly thereof with interleaves of carbon paper, etc.

According to a more recent development, strips of so-called "transfer tape" are applied to various business forms. The transfer tape is actually a pressure sensitive adhesive applied to a carrier tape strip. The adhesive adheres to paper and the tape can then be removed, leaving an adhesive strip on the paper. The tape is secured to the paper substrate of the business form by rolling the exposed adhesive side of the tape into contact with the paper substrate. Later, when used, the protective backing of the other adhesive side of the tape is removed so that other business forms can be adhesively secured to the original form.

While printing of such business forms is commonly carried out on high-speed presses at the rate of thousands of copies per hour, no suitable means has been yet devised for applying transfer tape strips to the completed forms at comparable rates. To date, the application of transfer tape strips to business forms and the like has been largely a manual operation in which individual sheets of paper are fed manually under pressure rolls which cut the strips to desired size and press them into adhesive contact with the paper substrate. The reason why such operations as the application of transfer tape to business forms have not been fully automated is that the length and spacing of the tape strips on the forms varies widely, depending upon the particular end product and means have not been devised to allow rapid adjustment of tape dispensing and applying apparatus to accommodate varying sizes of papers and permit application of variable lengths of the transfer tape to the paper substrate.

It would be highly desirable to provide automated equipment for carrying out processing operations such as specialized printing steps, the application of transfer tapes, etc. to paper substrates at speeds comparable to the rate at which such forms can be printed, such that the special processing steps do not bottleneck the overall paper product manufacturing operation.

Accordingly, it is a principal object of the invention to provide improved paper processing machinery.

Yet another object of the invention is to provide a paper processing machine specially adapted for carrying out various discrete processing steps repetitively at spaced points along a continuous sheet of paper withdrawn from a supply roll of the paper.

A further and more specific object of the invention is to provide a machine for applying strips of transfer tape at spaced points along a continuously moving strip of a paper substrate.

These and other, further and more specific objects and advantages of the invention will be apparent to those skilled in the art from the following detailed description, taken in conjunction with the drawings, in which:

FIG. 1 is a perspective view of a paper processing machine embodying the principles of the present invention;

FIG. 2 is a side view of one end of the processing drum of the machine of FIG. 1;

Figure 3A:
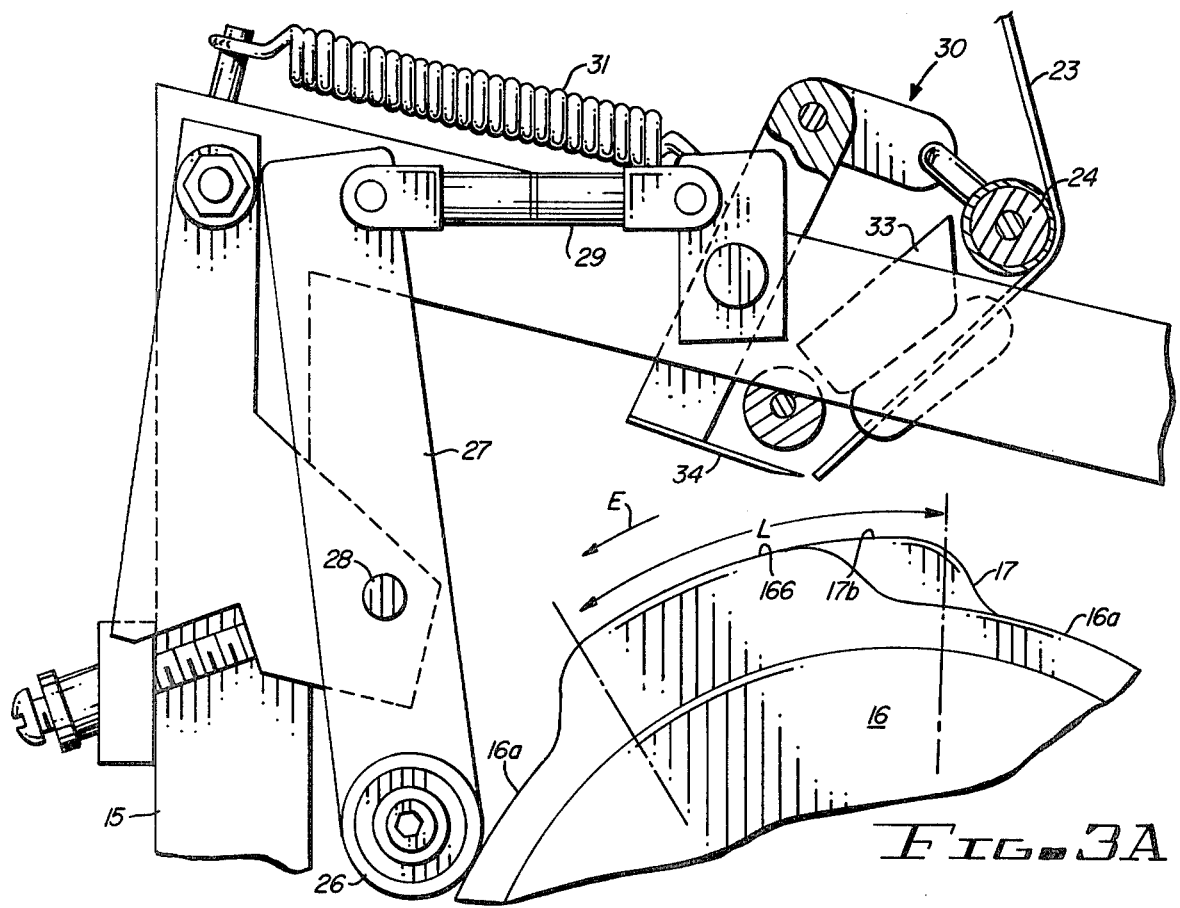
FIGS. 3A and 3B are partial side views of the timing mechanism of the machine of FIG. 1 which activates the processing elements of the machine.

Briefly, in accordance with the invention, I provide timing means in combination with a paper processing machine for timing the periodic operation of processing means which intermittently carry out a processing step on a continuous sheet of paper from a supply roll thereof. The paper processing machine will generally include a frame, a horizontal processing drum journalled for rotation in the frame, roller means journalled for rotation in the frame for guiding a continuous strip of paper from the supply roll into contact with the processing drum and for maintaining contact between the continuous strip of paper and the processing drum for a time period sufficient to permit the processing step to be carried out on the paper while it is supported by the processing drum. The processing means are normally carried by the frame proximate the processing drum. The timing means which, in combination with the paper processing machine, comprise the invention include at least two generally circular cam plates adjustably mounted coaxially on an end of the processing roller for rotation therewith. Each of the cam plates is shaped and dimensioned to provide on its periphery a circular cam flat surface extending along a portion of the cam plate periphery and a raised cam lobe surface extending along another portion of the cam plate periphery. The cam plates are adjustably rotatable with respect to each other around the axis of rotation of the processing drum to adjustably vary the angular displacement of the cam lobe surfaces of the cam plates with respect to each other, to adjust the effective length of the combined cam lobe surfaces of the cam plates. Cam follower means are carried by the frame and operatively associated with the cam plates for periodically actuating the processing means to perform a processing step on the paper passing onto and partially around the processing drum.

In accordance with another embodiment of the invention, the paper processing machine is adapted to apply spaced strips of transfer tape longitudinally along a continuous strip of paper from continuous supply rolls of the tape and the paper. In this embodiment, the machine comprises a frame and a horizontal drum for supporting a continuous strip of paper, journalled for rotation in the frame. First roller means are journalled for rotation in the frame for guiding the paper strip from the paper supply roll into contact with the drum and for maintaining contact between the continuous paper strip and the drum for a period of time sufficient to permit the transfer tape strips to be adhesively secured to the paper strip. Second roller means are provided, journalled for rotation in the frame, and are adapted for at least two operative positions, a first operative position in which the continuous tape strip from its supply roll is pressed into adhesively secured contact with the continuous paper strip passing over the horizontal drum and a second operative position in which the continuous tape strip is severed and the free end thereof maintained spaced away from the continuous paper strip passing over the horizontal drum. Timing means are provided which include cam means on an end of the processing roller and rotatable therewith, cam follower means carried by the frame and operatively associated with the cam means, and linkage means responsive to the cam follower means for actuating the second roller means between its first and second operative positions.

Turning now to the drawings, in which a presently preferred embodiment of the invention is depicted in the form of a machine for applying strips of transfer tape to a moving continuous sheet of paper substrate, FIGS. 1–3B depict an attachment for carrying out the tape application operation on a typical prior art collating machine such as, for example, a Schriber 550 collator manufactured by Harris Intertype Corp. The machine includes a pair of idler rollers 10 and 11 for continuously guiding a moving strip of paper 12 around a portion of a rotatable drum 13 journalled for rotation on an axle 14 carried by the collator frame 15. The continuous paper strip 12 moves under the roller 10 upwardly in the direction of the arrow A, downwardly in the direction of the arrow B, under the roller 11 and upwardly in the direction of the arrow C to other drums and rollers forming a part of the collator 15. A pair of generally circular cam plates 16 and 17 are received on the end of the drum 13 and secured thereto by a plate 18 having semi-circular apertures 19 which receive studs 20 extending therethrough and threadedly engaged with tightening nuts to secure the cam plates 16 and 17 in various respective relative positions. The cam plates 16 and 17 are rotatable with the drum 13 and are provided with cam flat surfaces 16A and 17A and cam lobe surfaces 16B and 17B. A continuous roll of transfer tape 21 is supported on an upstanding frame member 22 and positioned to feed a continuous strip 23 of the transfer tape downwardly in the direction of the arrow D to a tape strip guide roller 24.

Figure 3B:
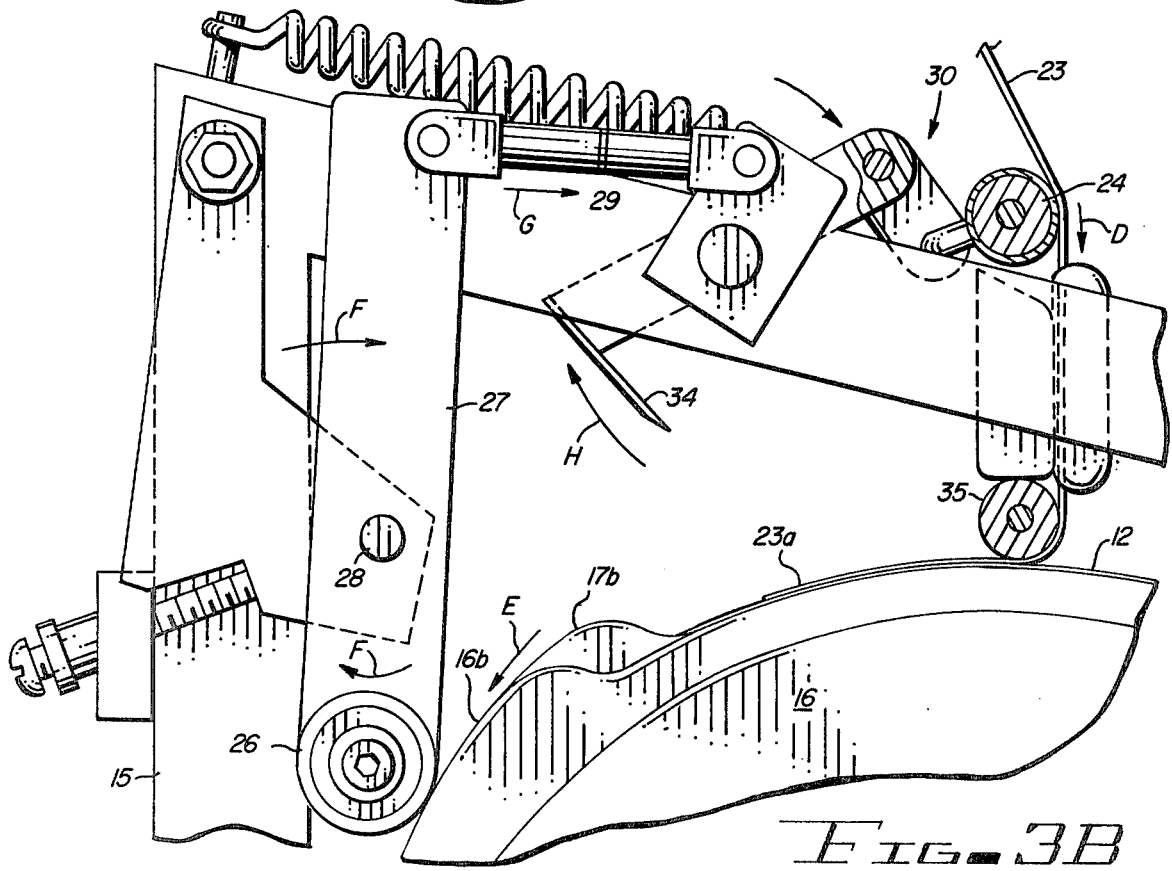

A cam follower consists of a roller 26 rotatably mounted on the lower end of an arm 27 which is rotatable about a pivot 28 and connected at its upper end through a linkage arm 29 to a 2-position tape applicator-cutter device generally indicated by reference numeral 30, described in more detail in FIGS. 3A and 3B.

FIG. 3A illustrates the retracted normal position of the tape applicator-cutting mechanism 30. With the drum 13 rotating in the direction of the arrow E, the roller 26 of the cam follower rides on the cam flat surfaces 16A and 17A of the cam plates 16 and 17 and is held in contact there by the retracting action of the spring 31 in the normally raised position shown in FIG. 3A. In this position, the transfer tape strip 23 is stationary and passes downwardly from the drum 21 around the roller 24 across the surface of a shoe 33 and terminates at the tip of a cutter blade 34. (Note that the strip is adhesively secured to the roller 24 and the shoe 33 with the tape applicator-cutter in the position shown in FIG. 3A.) As the drum 13 continues rotation in the direction of the arrow E, as shown in FIG. 3B, the roller 26 of the cam follower rides up on the cam lobe surfaces 16B and 17B of the cam plates 16 and 17, causing the arm 27 to pivot around the pin 28 in the direction of the arrow F, exerting force in the direction of the arrow G on the connecting arm 29, causing the roller 24 and shoe 33 to be cammed downwardly and the cutter 34 to be cammed upwardly in the direction of the arrow H. In the position shown in FIGS. 3B, a lower roller 35 strips the tape 23 away from the tip of the cutter 34 and forces it into contact with the paper strip 12 moving with the surface of the rotating drum 13 in the direction of the arrow E. The tape 23 is adhesively secured to the paper substrate 12 and the tape is intermittently withdrawn from the supply roll 21, leaving strips of the tape 23A adhesively secured to the paper strip 12. The length of the paper strip 23A which is finally deposited upon and adhesively secured to the paper strip 12 is dictated by the combined length of the superimposed cam lobe surfaces 16B and 17B, as shown more fully in FIGS. 4–6.

Figure 4:
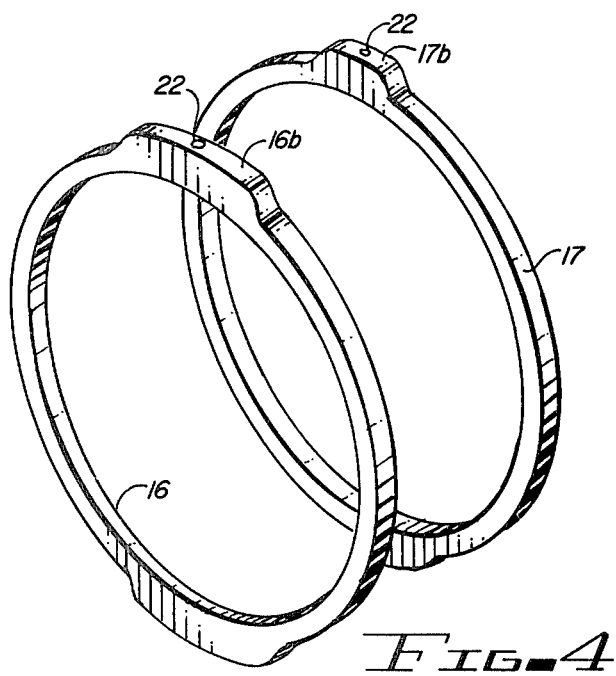
FIG. 4 is a perspective view of the timing cams which are normally mounted on the end of the drum of the processing machine, as shown in FIGS. 1–3B.
Figure 5:
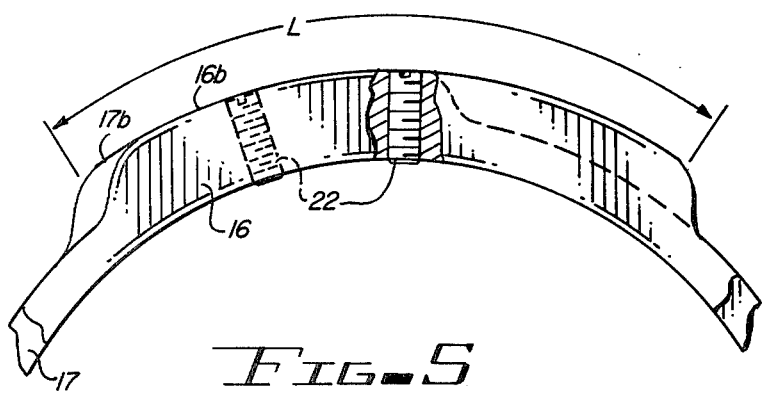
FIG. 5 is a partial sectional side view of the cams of FIG. 4 shown in a typical assembled relationship.
Figure 6:
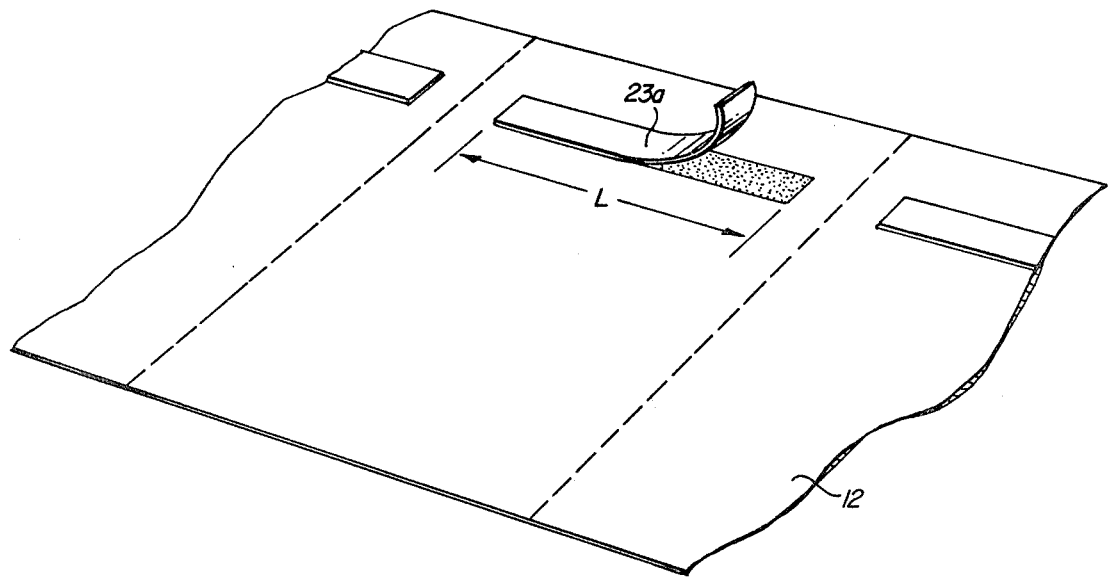
FIG. 6 is a perspective view of a typical product of the machine of FIGS. 1–5 with strips of transfer tape spaced therealong, forming the finished product of the process carried out by the machine of FIG. 1.

Referring more particularly to FIGS. 4–6, the cam plate rings 16 and 17 can be rotated relative to each other to increase or decrease the combined effective length of the superimposed cam lobe surfaces 16B and 17B in order to vary the length L of the transfer tape strip 23A deposited upon and adhesively secured to the continuously moving paper substrate strip 12. This adjustment in relative angular position of the cam rings 16 and 17 is accomplished by loosening the nuts 20 which hold the cover plate 18 on the end of the drum 13 and the set screws 22 extending through the cam lobe portions 16B and 17B. The rings 16 and 17 can then be rotated relative to each other upon the drum 12 until the proper effective cam length L is obtained. The set screws 22 and the nuts holding the cover plate 18 are then tightened to maintain the rings 16 and 17 in the desired angular relationship for co-rotation with the drum 13.

As will be apparent to those skilled in the art, from the description of the preferred embodiment of the invention shown in the drawings, the same arrangement of cam, cam follower and appropriate linkage could be used to actuate processing means other than the tape dispenser 30 of the drawings. For example, this timing apparatus could also be used to actuate printing, paper coloring, paper embossing, paper perforating, etc., apparatus to periodically carry out the desired process at spaced points along a continuously moving strip of paper moving over a processing drum and, accordingly, the broadest form of the invention includes the use of such timing means in connection with any such processing means.

Having described my invention in such terms as to enable those skilled in the art to understand and practice it, and having identified the presently preferred embodiments thereof, I claim:

1. A machine for applying spaced strips of transfer tape longitudinally along a continuous strip of paper from continuous supply rolls of said tape and said paper, comprising:

(a) a frame;
(b) means for supporting a continuous roll of transfer tape attached to said frame;
(c) a horizontal drum for supporting said continuous strip of paper, journalled for rotation in said frame;
(d) first roller means journalled for rotation in said frame for guiding said paper strip from said paper supply roll into contact with said drum and for maintaining contact between said continuous paper strip and said drum for a time period sufficient to permit said transfer tape strips to be adhesively secured to said paper strip;
(e) second roller means journalled for rotation in said frame and a cutter linked to said second roller, adapted for at least two operative positions,
 (i) a first operative position in which said continuous tape strip from said supply roll is pressed into adhesively secured contact with said continuous paper strip, and
 (ii) a second operative position in which said continuous tape strip is severed and the free end thereof maintained spaced away from said continuous paper strip; and
(f) timing means including
 (i) cam means on an end of said processing roller and rotatable therewith,
 (ii) cam follower means carried by said frame and operatively associated with said cam means, and
 (iii) linkage means responsive to said cam follower means for actuating said second roller means and said cutter between said first and second operative positions.

* * * * *